(12) United States Patent
Park

(10) Patent No.: US 7,578,744 B2
(45) Date of Patent: Aug. 25, 2009

(54) SLIP JOINT FOR USE IN STEERING SYSTEM

(75) Inventor: Jung Sik Park, Wonju-si (KR)

(73) Assignee: Mando Corporation, Pyeongtaek-si (KR)

( * ) Notice: Subject to any disclaimer, the term of this patent is extended or adjusted under 35 U.S.C. 154(b) by 339 days.

(21) Appl. No.: 11/544,527

(22) Filed: Oct. 6, 2006

(65) Prior Publication Data

US 2007/0082743 A1    Apr. 12, 2007

(30) Foreign Application Priority Data

Oct. 10, 2005    (KR) .................. 10-2005-0094998

(51) Int. Cl.
*F16D 3/06*    (2006.01)
(52) U.S. Cl. ........................ 464/162; 384/10
(58) Field of Classification Search ......... 464/162–166; 384/10, 29, 37, 40–42; 74/492, 493; 280/775
See application file for complete search history.

(56) References Cited

U.S. PATENT DOCUMENTS 4,667,530 A * 5/1987 Mettler et al. .................. 74/493
7,338,078 B2 * 3/2008 Yamada ....................... 280/775

FOREIGN PATENT DOCUMENTS

| EP | 1310691 B1 | 5/2003 |
|---|---|---|
| JP | 2000-38142 | 2/2000 |
| JP | 2003-54422 | 2/2003 |
| JP | 2003-156063 | 5/2003 |
| JP | 2003-247560 | 9/2003 |
| JP | 2003-291827 | 10/2003 |
| JP | 2004-196261 | 7/2004 |
| JP | 2005-83532 | 3/2005 |

OTHER PUBLICATIONS

European Search Report for Application No. 06255121.3-2425, dated Jan. 31, 2007.
Japanese Office Action for Application No. 2006-277015, dated Apr. 22, 2000.

* cited by examiner

*Primary Examiner*—Greg Binda
(74) *Attorney, Agent, or Firm*—Lahive & Cockfield, LLP; EuiHoon Lee

(57) ABSTRACT

A slip joint for a steering system may include a shaft having a plurality of shaft grooves formed on an outer peripheral surface in the longitudinal direction; a pipe having pipe grooves formed on an inner peripheral surface, the pipe grooves facing the shaft grooves so as to define cylindrical spaces, an end of the shaft being inserted into the pipe; a first pin inserted into one of the cylindrical spaces; a second spring pin inserted into a different one of the cylindrical spaces, the second spring pin being made of a cylindrical elastic body having a longitudinal seam; a third spring pin inserted into the second spring pin, the third spring pin being made of an elastic body; and a connector for integrally connecting the second spring pin to the first pin so as to constitute a slipper.

5 Claims, 11 Drawing Sheets

SLIP JOINT FOR USE IN STEERING SYSTEM

RELATED APPLICATION

This application claims convention priority to Korean patent application No. 2005-0094998 filed on Oct. 10, 2005, the content of which is incorporated by reference.

FIELD OF THE INVENTION

The present invention relates to a slip joint for a steering system. More particularly, the present invention relates to a slip joint for a steering system, which can reduce noise and vibration, improve steering precision, and guarantee easy fabrication by modifying the characteristics of a spring pin for reducing the clearance between a pipe and a shaft, which constitute the slip joint in a universal joint.

DESCRIPTION OF THE PRIOR ART

As generally known in the art, an automobile is provided with various devices in order to improve the safety and aid convenient driving. For example, a steering system is used to alter the direction of the automobile as desired by rotating a steering wheel. Particularly, the steering system changes the center of rotation of front wheels so that the automobile moves in a desired direction.

When the driver rotates the steering wheel in a desired direction, the steering system rotates a steering shaft, which is connected to the steering wheel. Then, the steering shaft transmits rotational force to a gearbox, which is composed of a rack and a pinion, via a universal joint.

The universal joint is positioned on the steering shaft, which is connected to the center of rotation of the steering wheel. The universal joint generally includes two yoke joints and a slip joint. The yoke joints are commonly used as connection means when two shafts intersect with each other at an angle. The yoke joints are designed so as to accommodate any change in angle of intersection of both shafts during driving. Particularly, the steering shaft is allowed to deflect within an angle of about 30°. The slip joint transmits rotational force from the steering shaft while allowing the shaft to extend/contract so that force acting in the direction of the shaft is absorbed.

The universal joint 140 has yoke joints 105 positioned on both ends thereof, respectively. Each yoke joint 105 has two yokes 110 positioned therein so as to engage with each other and a cross-shaped spider 115 positioned between the yokes 110 so that rotational force can be transmitted even when the steering shaft is deflected at an angle.

The yoke joints 105 on both ends of the slip joint 125 are connected to the shaft 120 and the pipe 130, respectively, so that rotational force is transmitted between the yoke joints 105 while allowing slip in the axial direction.

The pipe 130 is hollow so that the shaft 120, which has the shape of a rod, is inserted into the pipe 130 and connected thereto. As the shaft 120 is moved into/out of the pipe 130, force acting in the longitudinal direction of the driving and following shafts 100 and 135 is absorbed.

FIG. 2 is a sectional view showing a conventional slip joint, which includes a shaft 120, a pipe 130, first spring pins 200, shaft grooves 210, pipe grooves 205, and pins 215.

As shown, the shaft 120 has shaft grooves 210 formed on its outer peripheral surface, and the pipe 130 has pipe grooves 205 formed on its inner peripheral surface. The pipe grooves 205 and the shaft grooves 210 extend in the longitudinal direction of the slip joint 125. Respective shaft grooves 210 are coupled to corresponding pipe grooves 205 while facing each other so that cylindrical spaces are defined between them.

The pins 215 have the shape of rods and guarantee transmission of rotational force from the pipe 130 to the shaft 120, or vice versa. The first spring pins 200 are inserted into cylindrical spaces positioned opposite the pins 215. The first spring pins 200 have a seam extending in the longitudinal direction so that, due to elastic restoration force, they can enlarge, i.e. their outer diameter can increase. As such, the first spring pins 200 act as a type of elastic bodies.

The tendency of the first spring pins 200 towards enlargement reduces the clearance between the first spring pins 200 and the pipe grooves 205 and between the first spring pins 200 and the shaft grooves 210, as well as the clearance between the pins 215 (which are positioned opposite the first spring pins 200) and the shaft grooves 210 and between the pins 215 and the pipe grooves 205.

FIG. 3 is a perspective view showing a first spring pin of a conventional slip joint.

As shown, the first spring pin 200 is obtained by rolling a metal plate and has a continuous seam. The gap 220 at the seam enables the first spring pin 200 to enlarge towards the outer peripheral surface (i.e. the inner diameter increases) or contract towards the inner peripheral surface (i.e. the inner diameter decreases).

When the first spring pins 200 are to be inserted into a cylindrical space, the inner diameter of the first spring pin 200 is reduced. After insertion, the elastic force of the first spring pin 200 removes the clearance between the shaft groove 210 and the pin 215 and between the pipe groove 205 and the pin 215. The pin 215 is made of a metallic material.

According to the prior art, the first spring pins 200, the shaft 120, and the pipe 130 are made of a metallic material. This means that, when rotational force is transmitted from the shaft 120 to the pipe 130, noise and vibration are also transmitted from the shaft 120 to the pipe 130 via the first spring pins 200. As a result, vibration and noise are transmitted from the steering system to the driver, who operates the steering wheel, and discomfort him.

SUMMARY OF THE INVENTION

Accordingly, the present invention has been made to solve the above-mentioned problems occurring in the prior art, and an object of the present invention is to provide a slip joint for a steering system, which can reduce noise and vibration, improve steering precision, and guarantee easy fabrication by modifying the characteristics of a spring pin for reducing the clearance between a pipe and a shaft, which constitute the slip joint in a universal joint.

In order to accomplish this object, there is provided a slip joint for a steering system having a steering shaft and a gear unit for converting rotational movement of the steering shaft into linear movement, the steering shaft having a slip joint adapted to extend or contract in a longitudinal direction, the slip joint including a shaft having a plurality of shaft grooves formed on an outer peripheral surface in the longitudinal direction; a pipe having pipe grooves formed on an inner peripheral surface, the pipe grooves facing the shaft grooves so as to define cylindrical spaces, an end of the shaft being inserted into the pipe; a first pin inserted into one of the cylindrical spaces; a second spring pin inserted into a different one of the cylindrical spaces, the second spring pin being made of a cylindrical elastic body having a longitudinal seam; a third spring pin inserted into the second spring pin, the third spring pin being made of an elastic body; and a connector for integrally connecting the second spring pin to the first pin so as to constitute a slipper.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
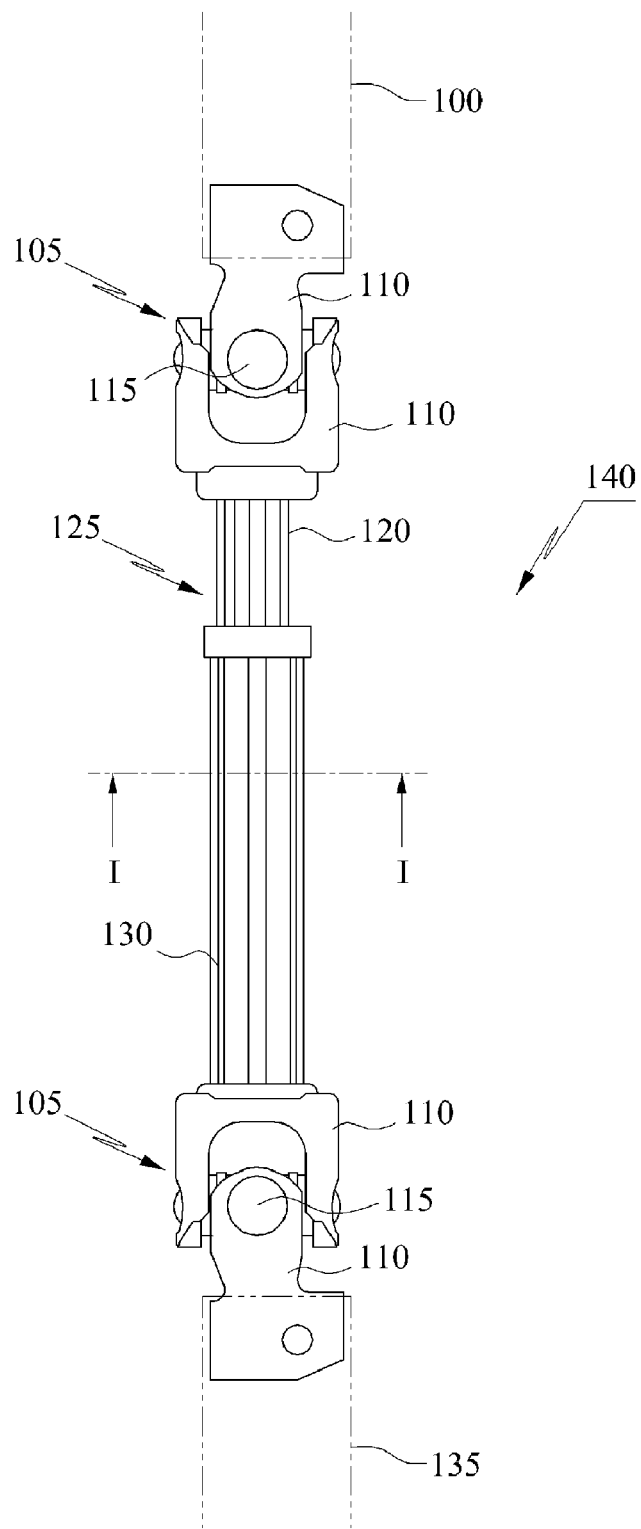
FIG. 1 is a top view partially showing a conventional slip joint on a universal joint.
Figure 2:
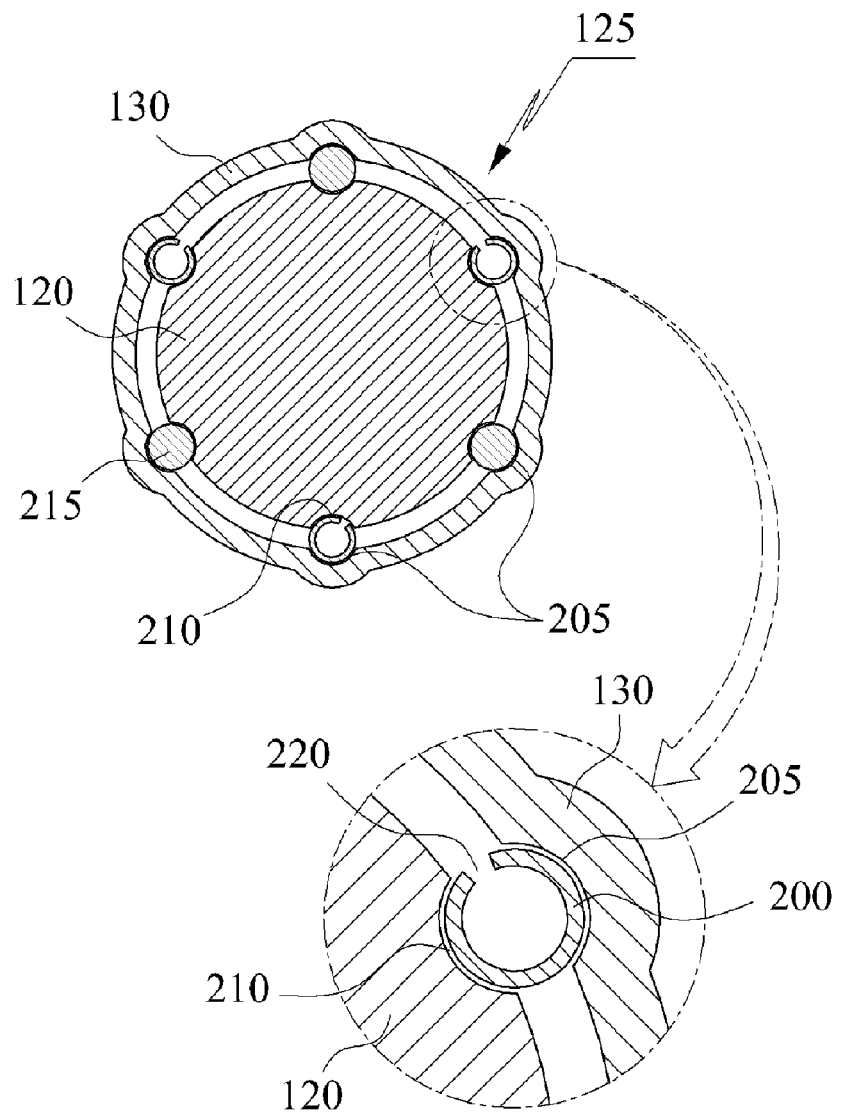
FIG. 2 is a sectional view showing a conventional slip joint.
Figure 3:
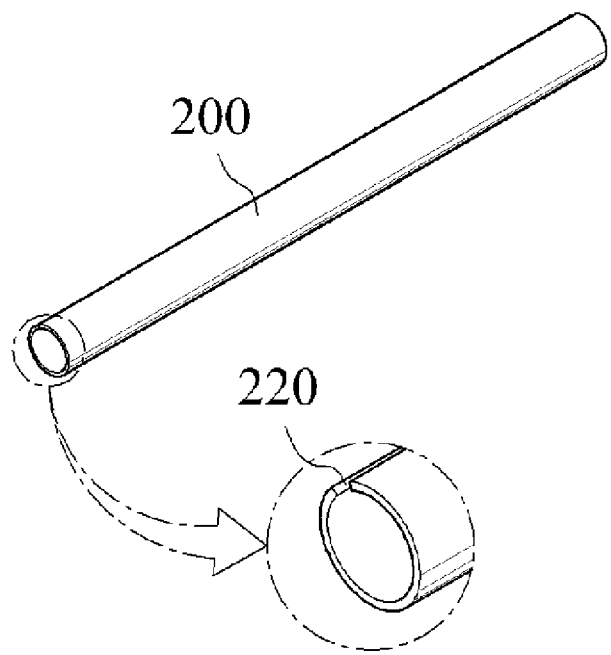
FIG. 3 is a perspective view showing a first spring pin of a conventional slip joint.

Hereinafter, preferred embodiments of the present invention will be described with reference to the accompanying drawings. In the following description and drawings, the same reference numerals are used to designate the same or similar components, and so repetition of the description on the same or similar components will be omitted.

Figure 4:
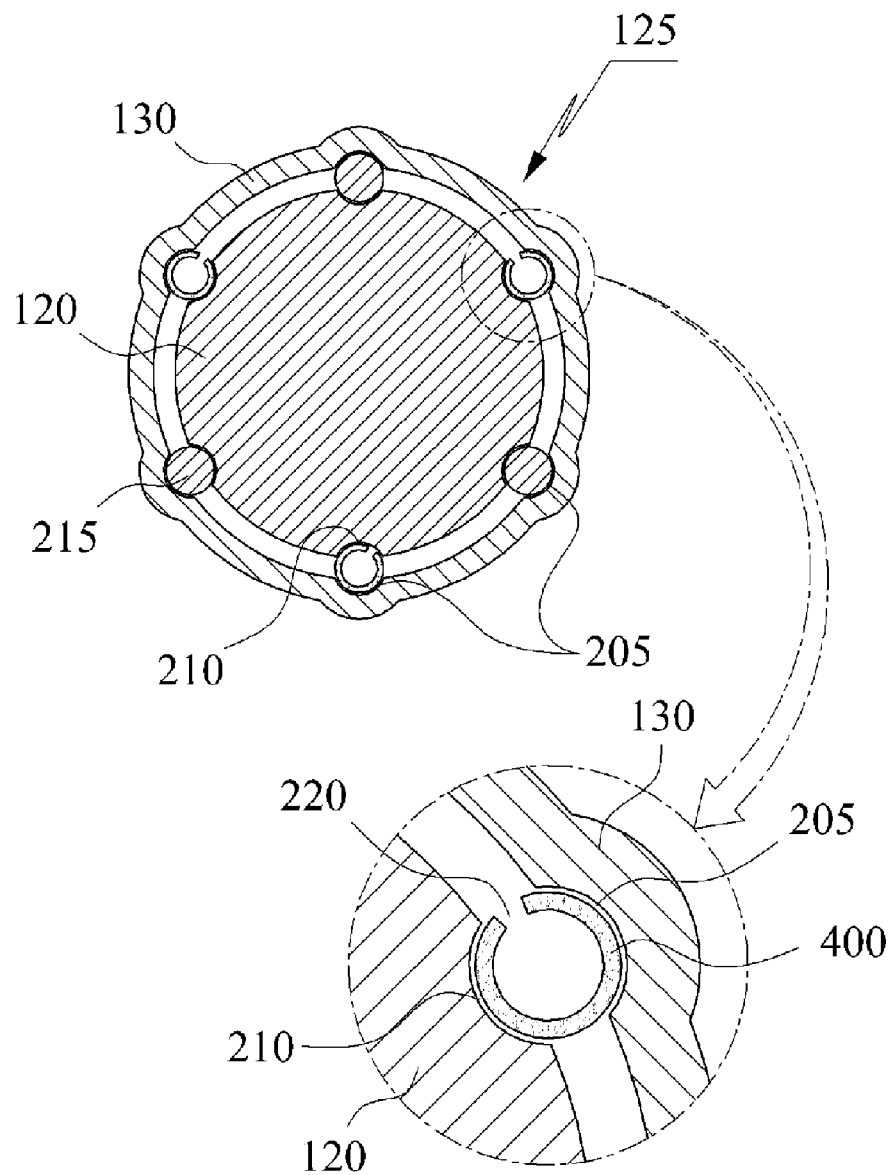
FIG. 4 is a sectional view showing a slip joint according to a first embodiment of the present invention.

FIG. 4 is a sectional view showing a slip joint according to a first embodiment of the present invention. The slip joint 125 includes a shaft 120, a pipe 130, shaft grooves 210, pipe grooves 205, pins 215, and second spring pins 400.

As shown, the shaft 120 has shaft grooves 210 formed on its outer peripheral surface, and the pipe 130 has pipe grooves 205 formed on its inner peripheral surface. The pipe grooves 205 and the shaft grooves 210 extend in the longitudinal direction of the slip joint. Respective shaft grooves 210 are coupled to corresponding pipe grooves 205 while facing each other so that cylindrical spaces are defined between them.

According to the present embodiment, six cylindrical spaces are positioned at an angular interval of 60°. As shown, a pin 215 is inserted into one of a pair of cylindrical spaces, which face each other, and a second spring pin 400 is inserted into the other.

The pins 215 have the shape of rods and guarantee transmission of rotational force from the pipe 130 to the shaft 120, or vice versa. The pins 215 have smaller diameters than those of the cylindrical spaces. The second spring pins 400 have larger diameters than those of the cylindrical spaces and are inserted into the cylindrical spaces positioned opposite the pins 215. The diameters of the second spring pins 400 shrink as the second spring pins 400 are inserted into the cylindrical spaces so that the second spring pins 400 tend to enlarge, due to their elastic restoration force, in such direction that their diameters increase.

The tendency of the second spring pins 400 towards enlargement reduces the clearance between the second spring pins 400 and the pipe grooves 205 and between the second spring pins 200 and the shaft grooves 210, as well as the clearance between the pins 215 (which are positioned opposite the second spring pins 400) and the shaft grooves 210 and between the pins 215 and the pipe grooves 205. Characteristically, the second spring pins 400 are made of a plastic material.

The second spring pins 400 have a continuous seam. The gap 220 at the seam enables the second spring pins 400 to enlarge towards the outer peripheral surface (i.e. the inner diameter increases) or contract towards the inner peripheral surface (i.e. the inner diameter decreases).

When the second spring pins 400 are to be inserted between the outer peripheral surface of the shaft 120 and the inner peripheral surface of the pipe 130, the inner diameter of the second spring pins 400 is reduced. After insertion, the elastic force of the second spring pins 400 removes the clearance between the shaft grooves 210 and the pins 215 and between the pipe grooves 205 and the pins 215.

According to the prior art, the first spring pins 200, the shaft 120, and the pipe 130 are made of a metallic material. This means that, when rotational force is transmitted from the shaft 120 to the pipe 130, noise and vibration are also transmitted from the shaft 120 to the pipe 130 via the first spring pins 200. As a result, vibration and noise are transmitted from the steering system to the driver, who operates the steering wheel, and discomfort him. In contrast the second spring pins 400 according to an embodiment of the present invention are made of a plastic material, not a metallic material, and reduce the amount of vibration and noise transmitted from the pipe 130 to the shaft 120, or vice versa.

Figure 5:
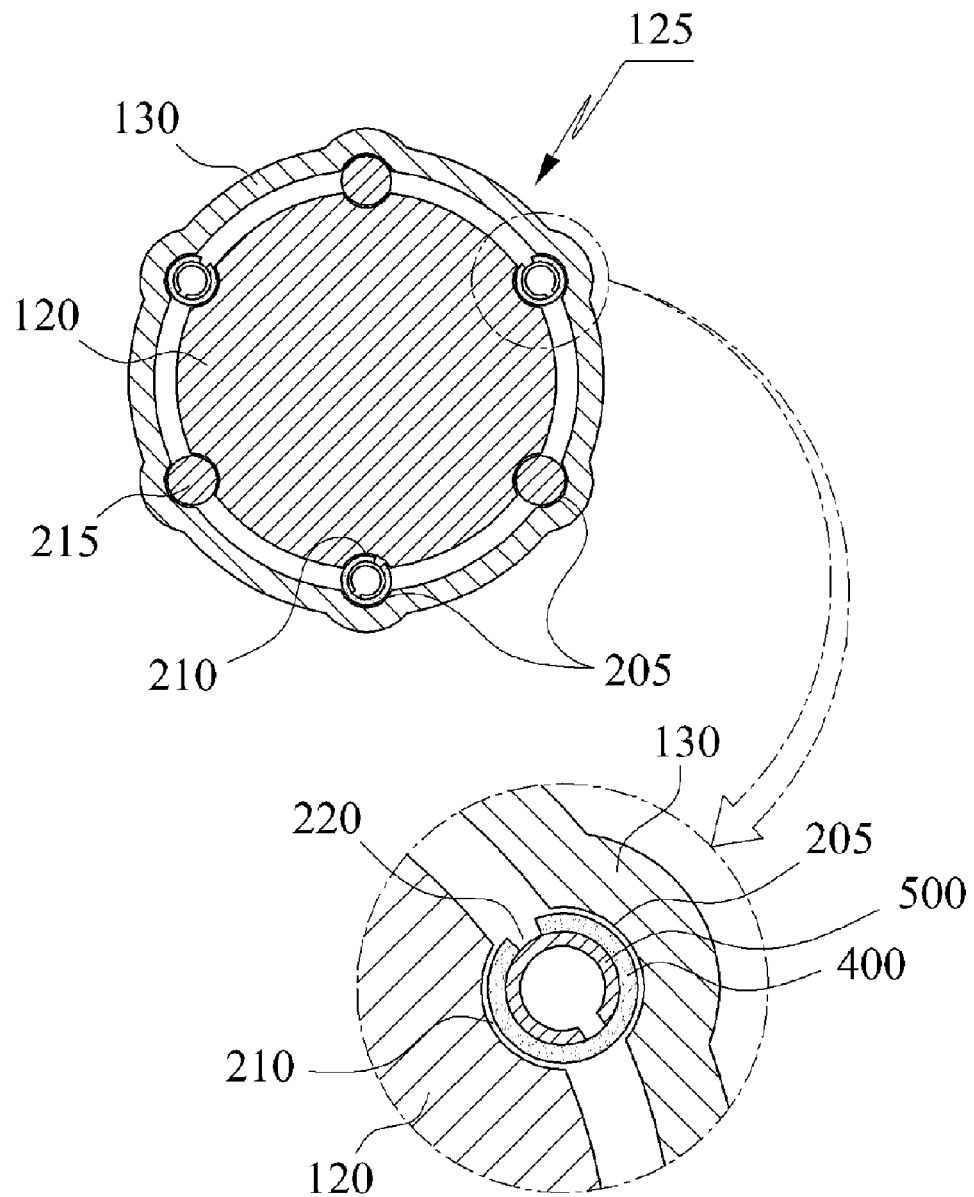
FIG. 5 is a sectional view showing a slip joint according to a second embodiment of the present invention.

FIG. 5 is a sectional view showing a slip joint according to a second embodiment of the present invention. The slip joint 125 includes a shaft 120, a pipe 130, pipe grooves 205, shaft grooves 210, pins 215, second spring pins 400, and third spring pins 500.

The second spring pins 400 are made of a plastic material, which has weaker elastic restoration force than metal. Therefore, metallic third spring pins 500 are positioned on the inner peripheral surface of the second spring pins 400, respectively. The third spring pins 500 have a continuous seam and can enlarge towards the outer peripheral surface (i.e. the inner diameter increases) or contract towards the inner peripheral surface (i.e. the inner diameter decreases).

When the third spring pins 500 are to be positioned on the inner peripheral surface of the Second spring pins 400, the inner diameter of the third spring pins 500 is reduced. After positioning, the elastic force of the third spring pins 500 enlarges the second spring pins 400 and removes the clearance between the shaft grooves 210 and the pins 215 and between the pipe grooves 205 and the pins 215.

Figure 6:
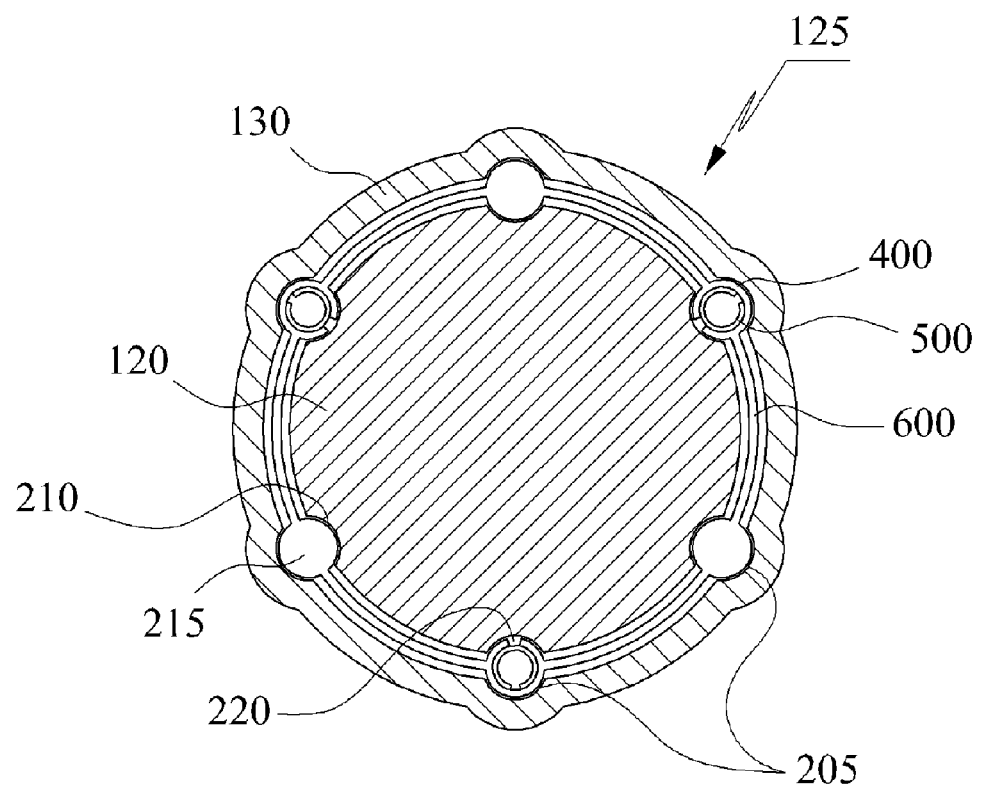
FIG. 6 is a sectional view showing a slip joint according to a third embodiment of the present invention.

FIG. 6 is a sectional view showing a slip joint according to a third embodiment of the present invention. The slip joint 125 includes a shaft 120, a pipe 130, pipe grooves 205, shaft grooves 210, pins 215, second spring pins 400, third spring pins 500, and a connector 600.

The connector 600 connects the pins 215 to the second spring pins 400. According to the present embodiment, three pairs of pins 215 and second spring pins 400 (i.e. a total of six separate components) are configured as an integral unit, which is hereinafter referred to as a slipper 700. This simplifies the assembly process.

Figure 7:
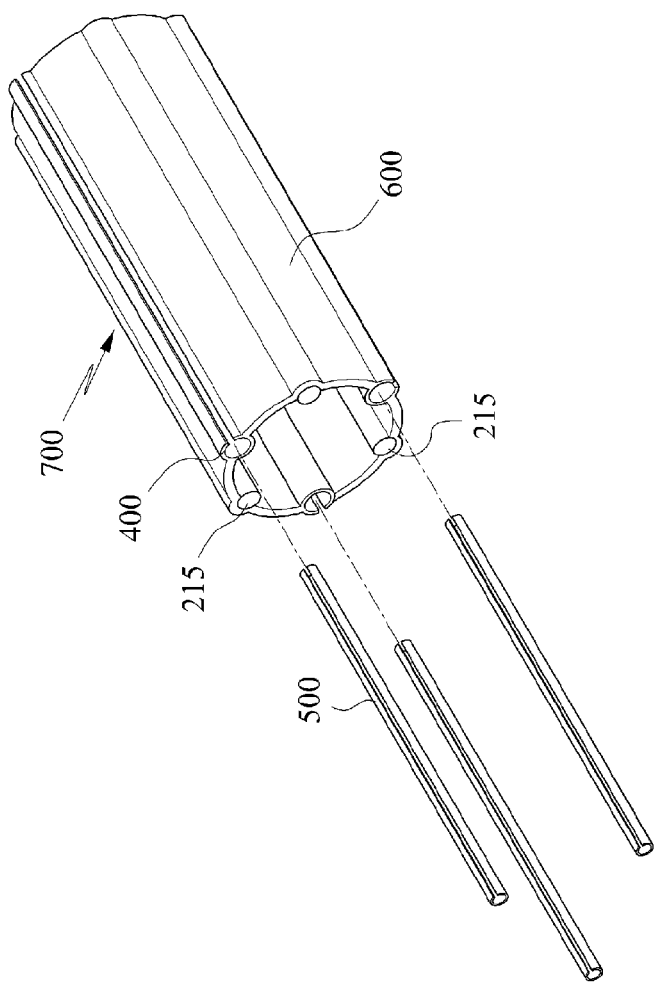
FIG. 7 is a perspective view partially showing a slip joint according to the third embodiment of the present invention.

FIG. 7 is a perspective view partially showing a slip joint according to the third embodiment of the present invention. The slip joint includes third spring pins 500 and a slipper 700 including pins 215, second spring pins 400, and a connector 600.

As shown, the connector 600 connects one side of the second spring pins 400 to one side of the pins 215 and extends along the outer peripheral surface of the shaft 120 or along the inner peripheral surface of the pipe 130. Although the connector 600 continuously extends along the pins 215 and the second spring pins 400 in the present embodiment, the connector 600 may partially connect them in an alternative embodiment.

Figure 8:
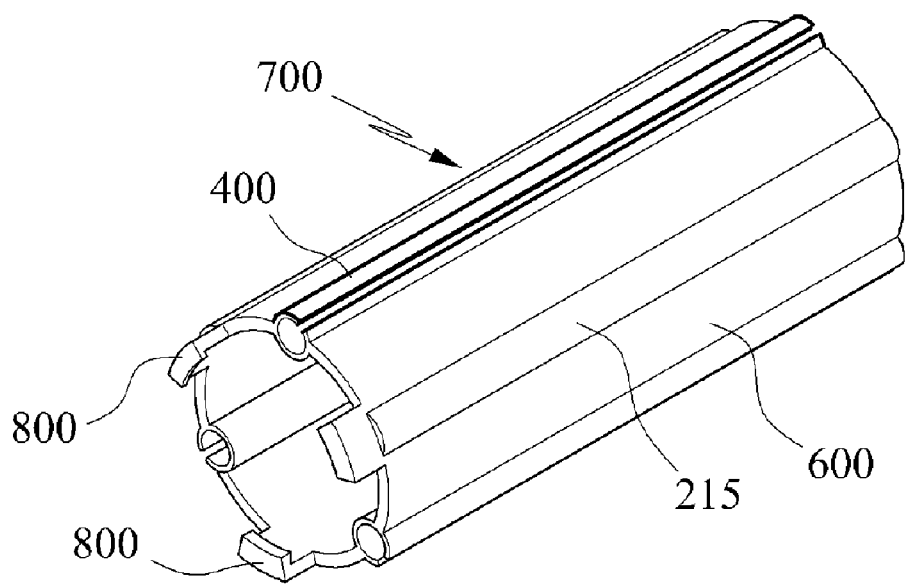
FIG. 8 is a perspective view partially showing a slip joint according to a fourth embodiment of the present invention.

FIG. 8 is a perspective view partially showing a slip joint according to a fourth embodiment of the present invention. The slip joint has a slipper 700 including pins 215, second spring pins 400, a connector 600, and latching portions 800.

As shown, the slipper 700 is provided with latching portions 800, which fix the slipper 700 to the shaft grooves 210. The pins 215 and the second spring pins 400 are configured as an integral unit by the connector 600.

In order to fix the slipper 700 to the shaft 120, the latching portions 800 extend from the outer peripheral surface of an end of the slipper 700 towards the center of the shaft 120.

Figure 9:
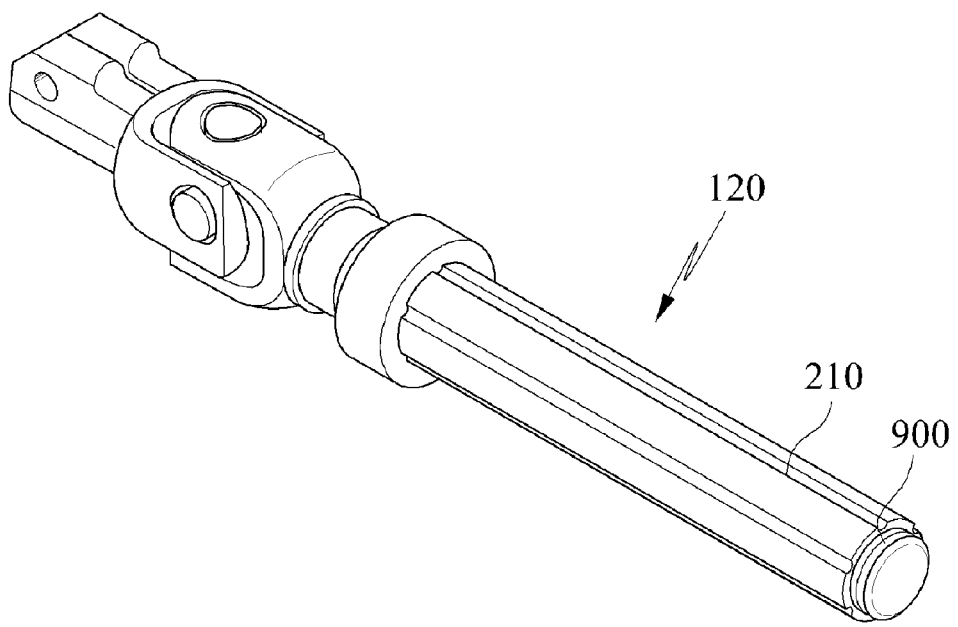
FIG. 9 is a perspective view partially showing a slip joint according to a fifth embodiment of the present invention.

FIG. 9 is a perspective view partially showing a slip joint according to a fifth embodiment of the present invention. The slip joint includes a shaft 120, shaft grooves 210, and a latching portion groove 900.

The latching portion groove 900 is formed by depressing the outer peripheral surface of an end of the shaft 120 so that the latching portions 800, which are formed on the slipper 700 shown in FIG. 8, are seated on the shaft 120.

Figure 10:
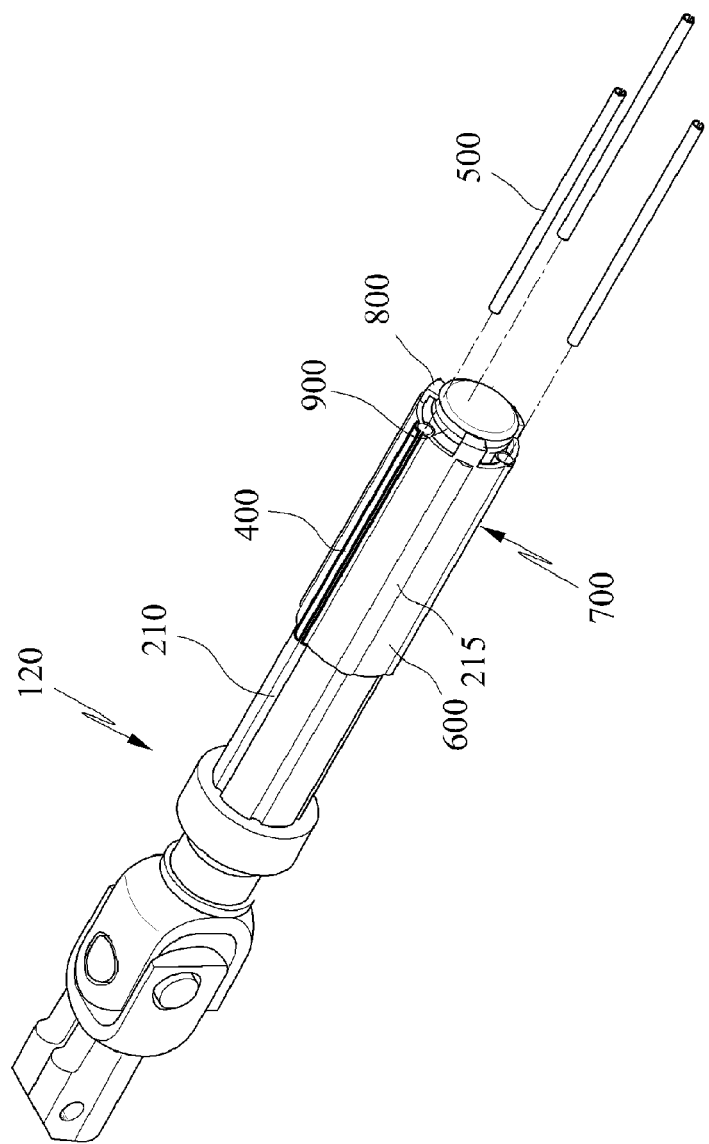
FIG. 10 is a perspective view partially showing a slip joint according to the fourth and fifth embodiments of the present invention.

FIG. 10 is a perspective view partially showing a slip joint according to the fourth and fifth embodiments of the present invention. The slip joint includes a shaft 120, having shaft grooves 210 and a latching portion groove 900; a slipper 700 having pins 215, second spring pins 400, a connector 600 and latching portions 800; and third spring pins 500.

When the shaft 120 is placed inside the slipper 700, the pins 215 and the second spring pins 400 are seated on the shaft grooves 210. When the shaft 120 is fully placed inside the slipper 700, the latching portions 800 on the slipper 700 are seated on the latching portion groove 900 and fix the slipper 700 to the shaft 120. Furthermore, third spring pins 500, which are made of a metallic material, are positioned on the inner peripheral surface of the second spring pins 400. When the shaft 120 is placed into the pipe 130 with the slipper 700 mounted thereon, assembly of the slip joint 125 is completed.

According to the prior art, the pins 215 and the first spring pins 200 are separately positioned on the pipe 130 or the shaft 120. This requires a long assembly time and costs a large amount of money. However, the present invention has solved these problems.

Figure 11:
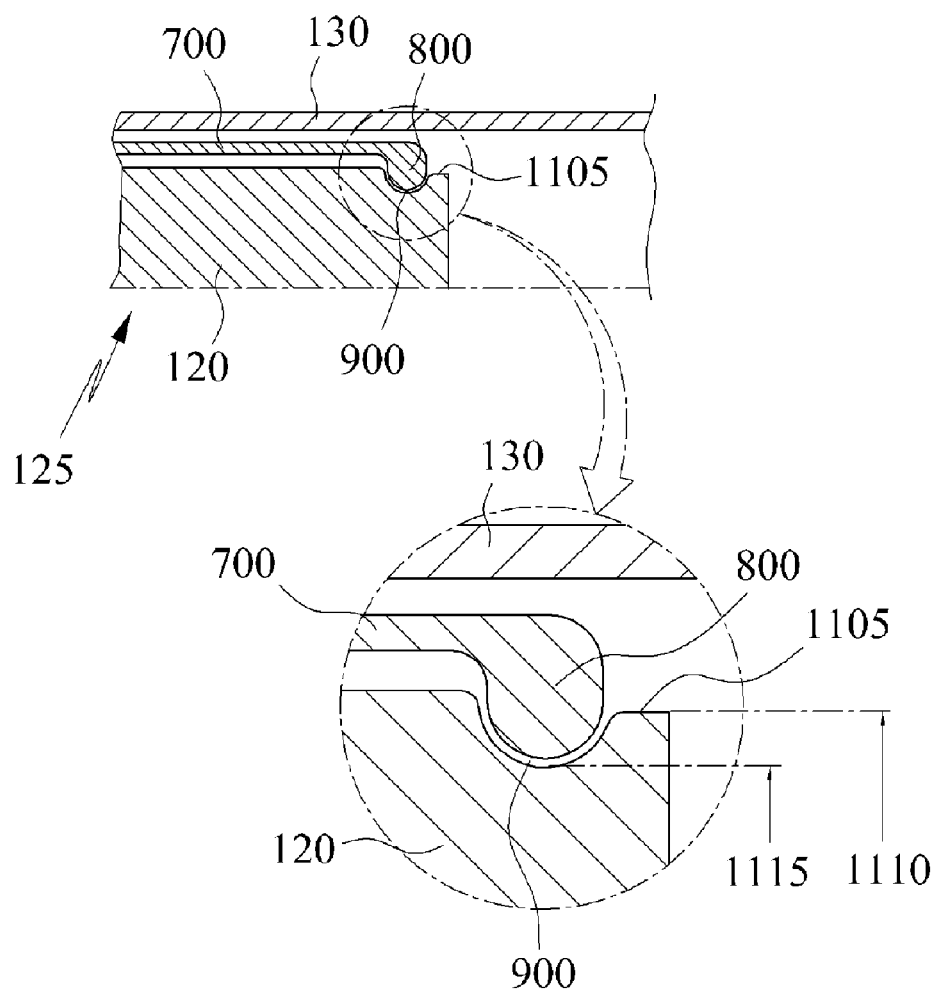
FIG. 11 is a sectional view partially showing a slip joint according to the fourth and fifth embodiments of the present invention.

FIG. 11 is a sectional view partially showing a slip joint according to the fourth and fifth embodiments of the present invention. The slip joint includes a pipe 130; a shaft 120 having a latching portion groove 900 and a step 1105; and a slipper 700 having a latching portion 800. In the drawing, reference numeral 1115 refers to the inner diameter of the latching portion 800, and 1110 refers to the outer diameter of the step 1105.

FIG. 11 shows in detail the slipper 700 when fixed to the shaft 120. The latching portion 800 protrudes from an end of the slipper 700 towards the center of the shaft 120, which is provided with a latching portion groove 900 so that the latching portion 800 is seated thereon.

The step 1105 on the shaft 120 is positioned adjacent to the latching portion groove 900. The distance between the upper end of the step 1105 and the center of the shaft 120 is defined as the outer diameter 1110 of the step 1105, and the distance between the lower end of the latching portion 800 and the center of the shaft 120 is defined as the inner diameter 1115 of the latching portion 800. The outer diameter 1110 of the step 1105 is larger than the inner diameter 1115 of the latching portion 800.

The slipper 700 cannot detach from the shaft 120 unless it moves over the step 1105. Due to the fact that the outer diameter 1110 of the step 1105 is larger than the inner diameter 1115 of the latching portion 800, the slipper 700 cannot easily detach from the shaft 120. When the slipper 700 is to be assembled to the shaft 120, it must be press-fitted to it.

As mentioned above, the slip joint for a steering system according to the present invention is advantageous in that, since it has a clearance compensation structure, it can reduce noise and vibration and improve steering precision by positioning a slipper between a pipe and a shaft, which constitute the slip joint in a universal joint, so that the clearance is compensated for.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A slip joint for a steering system having a steering shaft and a gear unit for converting rotational movement of the steering shaft into linear movement, the steering shaft having a slip joint adapted to extend or contract in a longitudinal direction, the slip joint comprising:
    a shaft having a plurality of shaft grooves formed on an outer peripheral surface in the longitudinal direction;
    a pipe having pipe grooves formed on an inner peripheral surface, the pipe grooves facing the shaft grooves so as to define cylindrical spaces including at least a first cylindrical space and a second cylindrical space, an end of the shaft being inserted into the pipe;
    a first pin inserted into the first cylindrical space;
    a second spring pin inserted into the second cylindrical space, the second cylindrical space being free of the first pin, the first cylindrical space being free of the second spring pin, the second spring pin being made of a cylindrical elastic body having a longitudinal seam; and
    a connector for integrally connecting the second spring pin to the first pin so as to constitute a slipper.

2. The slip joint as claimed in claim 1, wherein the first pin has a smaller diameter than that of the cylindrical spaces and the second spring pin has a larger diameter than that of the cylindrical spaces.

3. The slip joint as claimed in claim 2, further comprising a third spring pin inserted into the second spring pin, the third spring pin being made of an elastic body.

4. The slip joint as claimed in claim 3, further comprising a fastener for fixing the slipper to the shaft.

5. The slip joint as claimed in claim 4, wherein the fastener comprises:
    a latching portion formed on an end of the slipper so as to protrude inwards; and
    a latching portion groove formed by depressing an outer peripheral surface of an end of the shaft.

* * * * *